June 13, 1961 R. C. BOGERT 2,987,878
VARIABLE GEOMETRY INTAKE DUCT
Filed May 22, 1957 4 Sheets-Sheet 1
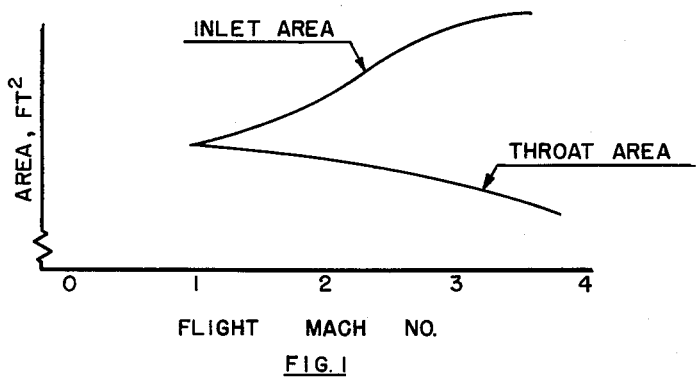
FIG. I
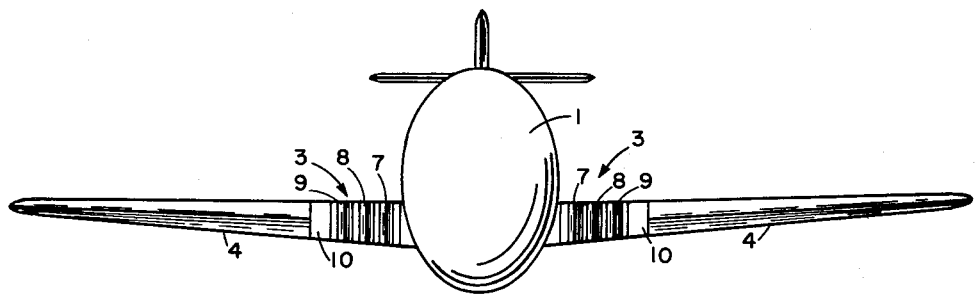
FIG. 2
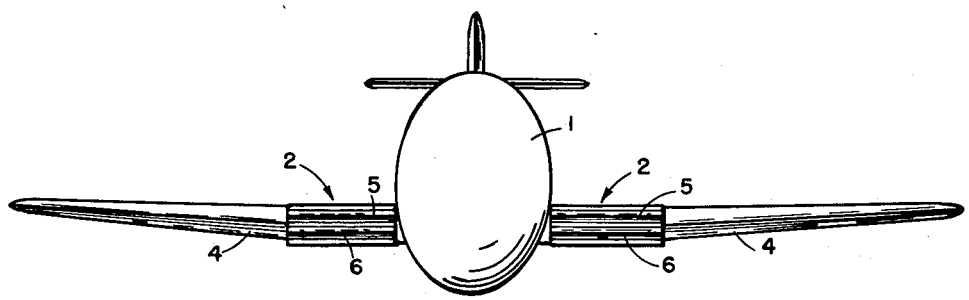
FIG. 3
INVENTOR.
ROBERT C. BOGERT
BY Thomas S. MacDonald
ATTORNEY June 13, 1961 R. C. BOGERT 2,987,878
VARIABLE GEOMETRY INTAKE DUCT
Filed May 22, 1957 4 Sheets-Sheet 2

INVENTOR.
ROBERT C. BOGERT
BY Thomas S. MacDonald
ATTORNEY

June 13, 1961 R. C. BOGERT 2,987,878
VARIABLE GEOMETRY INTAKE DUCT
Filed May 22, 1957 4 Sheets-Sheet 3

INVENTOR.
ROBERT C. BOGERT
BY Thomas S. MacDonald
ATTORNEY

INVENTOR.
ROBERT C. BOGERT
BY Thomas S. MacDonald
ATTORNEY

United States Patent Office 2,987,878
Patented June 13, 1961

2,987,878
VARIABLE GEOMETRY INTAKE DUCT
Robert C. Bogert, Arcadia, Calif., assignor to
North American Aviation, Inc.
Filed May 22, 1957, Ser. No. 660,857
6 Claims. (Cl. 60—35.6)

This invention relates to inlet ducts for air-breathing engines such as ram and turbojet engines and more particularly to a multicell inlet which has means to vary its geometry to provide optimum operating conditions over a wide range of speeds.

In supersonic ram-jet and turbojet engines operation the air flow through the engine is slowed to a subsonic speed before passing into the combustion area of the engine. This causes a shock wave to form in the air in front of the engine. One of the problems that modern propulsion engineers face is that in order to get the maximum pressure recovery of the air in a high speed aircraft intake duct the duct must be designed to slow the air relative to the duct by efficient compression, approaching isentropic compression if possible, to nearly Mach 1 before the air passes through the normal shock transition region between subsonic and supersonic flow. This is accomplished by designing the inlet duct to constrict the flow of air from the inlet area down to the throat area which slows and compresses the air. If the aircraft were to operate at only one speed this problem could be overcome as it has been in the past by designing an inlet duct to give optimum pressure recovery at that particular speed. However, quite often it is necessary that the aircraft be able to operate over a wide range of speeds with good pressure recovery. Therefore, past designers have suggested inlets with a flexible wall to vary the geometry of the inlet duct as shown in Robert's U.S. Patent No. 2,596,435 and the British Patent No. 672,917. Their suggested disclosures do not answer the problem for supersonic speeds. This is because at or near the flight speed of Mach 1 maximum pressure recovery is obtained with little or no convergency between the inlet area and the throat area of the duct. However, as the speed of the aircraft is increased the inlet area of the duct must also be increased since the rate of air flow needed to power the aircraft at higher speeds must be increased more than the rate of air flow which is obtained merely because of the increased speed with the same inlet duct. More simply stated the engine requires more than twice as much air to go twice as fast. However, as the air speed is increased the isentropic compression of the air as it passes from the inlet area to the throat area must be greater in order to slow the air down relative to the duct from this higher speed to near Mach 1 before it passes the normal shock wave.

For optimum pressure recovery it would be desired to have the shock wall at the throat area of an inlet duct; however, for practical considerations the engine fuel rate is regulated so that the shock wall is positioned behind the throat to guard against the shock wall being "blown out" the front end of the inlet duct by a sudden reduction of relative air speed such as would be caused by a gust of air in the same direction as the aircraft is moving.

The object of this invention is to provide a gas inlet duct which has variable geometry to provide optimum operating conditions over a wide range of air speeds through the duct.

A further object is to provide an engine intake duct including means for varying the inlet area and the throat area of the duct in mutually inverse relation.

Another object is to provide a multitubular jet engine intake duct which will take in the optimum amount of air and slow the air down to near Mach 1 by near isentropic compression over a wide range of speed.

Other objects of this invention will become apparent in the detailed description below wherein:

FIG. 1 shows an approximate curve showing the relative changes needed in the duct inlet and throat areas for optimum pressure recovery over the wide range of speeds;

FIG. 2 shows the present inlet duct located in the wings of the aircraft with the baffles in the horizontal position;

FIG. 3 shows the present inlet duct in the aircraft wings with the baffles in the vertical position;

Figure 4:
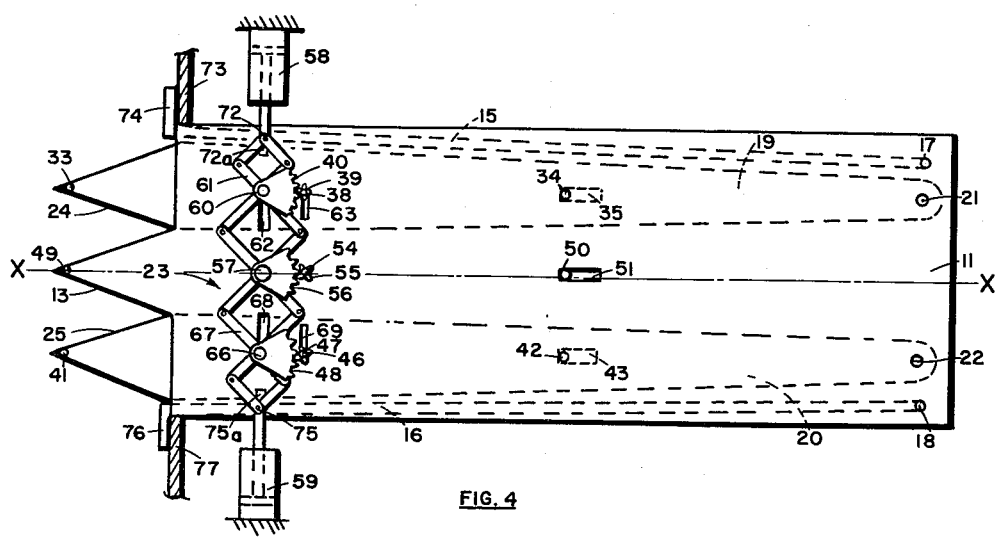
FIG. 4 shows a side view of the duct having a longitudinal axis X—X in which the center baffle is mounted to the fixed duct wall and two duct walls are removably mounted to diminish or increase the inlet area of the duct.

FIG. 1 shows graphically the relation between the inlet area and the throat area of the duct at various supersonic air speeds. The engine needs more air at the higher speeds as explained above and therefore the inlet area of the duct is increased; however, at the same time the throat area has to be decreased to provide the increased isentropic compression needed to slow the air down relative to the duct.

FIGS. 2 and 3 show the aircraft fuselage 1 with the intake duct systems 2 and 3 located in the wings 4 near the point where wings 4 join to the fuselage 1. Naturally the duct system could also be located in the fuselage 4. It might also be noted that duct system 2 is provided with only two baffles 5 and 6 whereas duct system 3 is provided with three baffles 7, 8 and 9. The details below describe a duct system with three baffles but naturally the exact number of baffles is not part of the invention. Flanges 10 are provided at the out-board sides of duct system 3 so that as the inlet area is contracted as explained below there will not be an opening exposed in the leading surface of the wing.

FIG. 4 shows a detailed view of one modification of the present invention. It is provided with two oppositely mounted fixed duct wall portions 11 and 12 which are mounted to an aircraft (not shown). Fixed duct wall portion 12 is shown more clearly in FIGS. 5, 6 and 7. Fixed duct wall portions 11 and 12 each come to a point near the center of their respective forward edges providing projections 13 and 14, the latter shown more clearly in FIG. 5. These fixed duct wall portions 11 and 12 are shown as being planar but it should be clear that they could be curved as longitudinal segments of the circular duct and all that is required is that there are portions of fixed duct walls of any shape to which other apparatus of the invention may be mounted. The duct is provided with movable portions in the form of movable duct wall portions 15 and 16 which are swingably mounted by their rearward ends transversely between duct walls 11 and 12 on axes 17 and 18 respectively. Thereby, they may be moved toward and away from each other by the constrained linkage described below in order to decrease or increase the inlet area of the duct. Duct wall portions 11, 12, 15 and 16 are shown as forming a rectangular cross-section but it should be understood that the duct walls are merely means of forming a variable inlet area and throat section of the duct and may have other cross-sectional shapes. Movable baffle support panels 19 and 20 are shown as hidden lines in FIG. 1 as they are swingably mounted on the opposite side of fixed duct wall portion 11 on axes 21 and 22 respectively in order that they may be moved by the constrained linkage 23 in the manner described below. Each of these panels come to a point at their forward ends providing projections 24 and 25 respectively.

Figure 5:
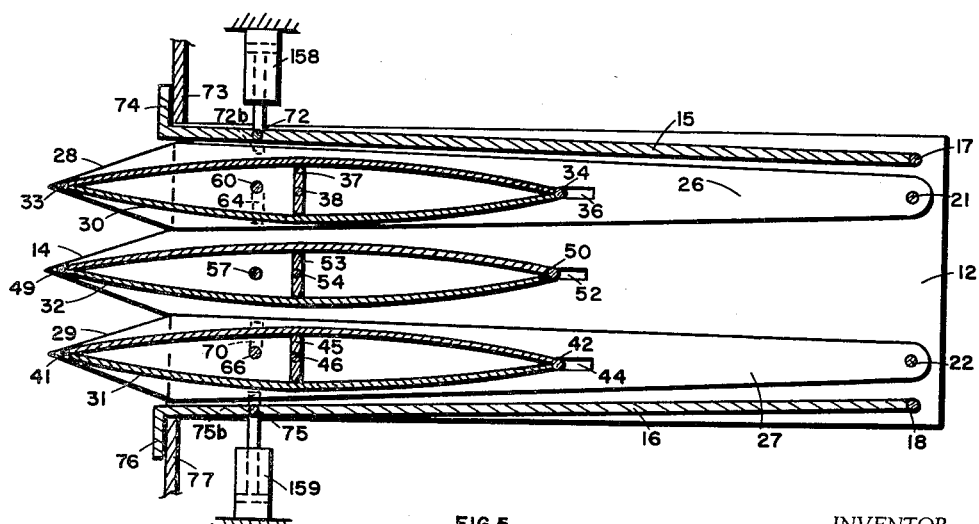
FIG. 5 shows a cross-sectional view of the duct shown in FIG. 4.

The cross-sectional view, FIG. 5, shows the opposite fixed duct wall 12 with movable duct walls 15 and 16 mounted on axes 17 and 18 as described above. Movable baffle support panels 26 and 27 are swingably mounted on axes 21 and 22 similar to the way in which baffle support panels 19 and 20 are mounted. Panels 26 and 27 come to a point at their respective forward ends providing projections 28 and 29 similar to projections 24 and 25. Expandable baffle means are provided within the throat section of the duct in order to vary the throat area for operation at different speeds. In the specific modification shown, variable baffles 30, 31 and 32 are each constructed of two sheets of a flexible material such as stainless steel sheeting and are mounted transversely within the duct. Naturally, if operating conditions demand, sections of a thicker stiff material are used and joints are provided for flexibility. However, as such jointed stiff material is in effect flexible the invention is described and claimed in therms of flexible material.

Baffle 30 is mounted with its forward edge between projections 24 and 28 by a means such as shaft 33 which is attached to the projections 24 and 28 by any suitable means such as welding or passing the shaft through a hole in each projection and bolting it there. The rearward edge of the baffle 30 is supported by shaft 34 which is slideably mounted between support panels 19 and 26 in slots 35 and 36 in the support panels respectively. Positioning means are provided in order to vary the thickness of baffle 30 and thereby control the throat area of the duct. In this modification the positioning means include positioning cam 37 mounted between the two flexible surfaces of baffle 30 and between the support panels 19 and 26 on rotatable shaft 38. Shaft 38 extends through the support panels and is provided with positioning gear 39 which cooperates with a sector gear 40 that is mounted on an arm of the constrained linkage 23 described below. Sector gear 40 provides a connecting means to transfer the motion of arms of linkage 23 to the positioning gear 39. Thereby, when the constrained linkage rotates the sector gear 40, positioning gear 39 will rotate positioning cam 37 to vary the thickness of the baffle 30. It should be apparent that if operating conditions require more than one positioning cam could be used within the baffle and the baffle may be shaped in any particular contour desired.

Similarly, baffle 31 is mounted at its forward edge between projections 25 and 29 on shaft 41 which is attached to the projections 25 and 29 in the same manner as shaft 33 above. The rearward edge of the baffle 31 is supported by shaft 42 which is slideable between support panels 20 and 27 in slots 43 and 44 in said panels respectively. The thickness of baffle 31 is varied similarly to baffle 30 by providing positioning cam 45 mounted between the flexible surfaces of baffle 31 and between the support panels 20 and 27 on rotatably mounted shaft 46. Shaft 46 extends through the fixed duct walls 11 and 12 and is provided with positioning gear 47 which cooperates with sector gear 48 that is mounted on one arm of the constrained linkage 23 described below. As with baffle 30, the constrained linkage 23 rotates sector gear 48 which rotates positioning cam 45 through positioning gear 47 and thereby varies the thickness of baffle 31.

Baffle 32 differs from baffles 30 and 31 in that it is mounted between fixed duct walls 11 and 12 instead of between baffle support panels, and therefore the baffle does not move relative to the duct walls. Similar to the other baffles, it is mounted between projections 13 and 14 on shaft 49 which is attached to the projections 13 and 14. The rearward edge of baffle 32 is supported by shaft 50 slideably mounted between fixed duct walls 11 and 12 in slots 51 and 52 in said walls respectively. The thickness of baffle 32 is varied in the same manner as the other baffles in that positioning cam 53 is mounted between the two flexible surfaces of baffle 32 and between the fixed duct walls 11 and 12 on rotatable shaft 54. Shaft 54 is provided with positioning gear 55 which cooperates with sector gear 56 that is mounted on one arm of the hereinafter described constrained linkage 23. As with the other baffles, the constrained linkage rotates sector gear 56 which rotates positioning cam 53 through positioning gear 55 and thereby varies the thickness of baffle 32.

The projections are provided at the forward portions of the baffle support panels and the fixed duct walls in order to allow the shock wave of the air to position itself behind the throat area of the duct more easily by providing air spillage areas. This construction is important in the event that the shock wave inside the duct is "blown out" the front of the duct as described above. If the projections were not there to form air spillage areas a detached shock wave would form in front of the inlet which would cause the jet engine to operate very inefficiently. In order to make the detached shock wave move back into the throat area of the duct, the auto-navigator or pilot would have to slow the aircraft down to below Mach 1 or flatten the external baffle means to reduce the convergence of the throat of the duct. Either of these operations would take time and also it is not feasible to make the auto-navigator capable of sensing when the shock wave has been "blown out" and then vary the speed of the missile or the geometry of the inlet duct as required. However, with the design provided by the present invention the air is allowed to spill out the sides of the duct area and does not have to pass through the throat area of the duct. This allows the shock wave to move partially into the duct. When it obtains such an intermediate position it is very easy for the shock wave to move to the position just behind the throat which is desired for maximum practical pressure recovery.

Figure 6:
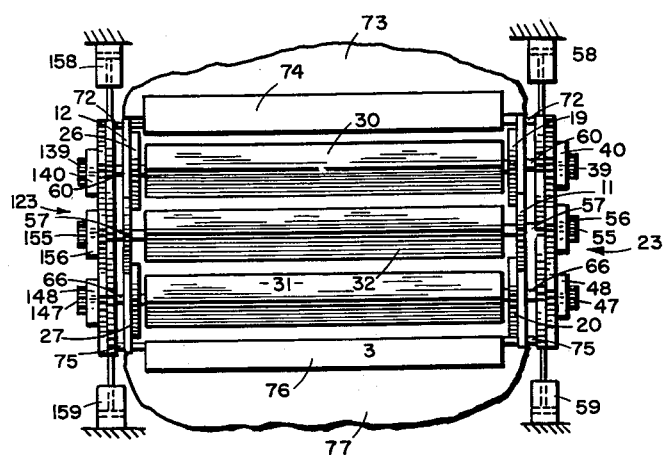
FIG. 6 shows a front view of the duct shown in FIG. 4.

FIG. 4 shows one form of constrained linkage 23 necessary to enable either the pilot or automatic inlet control system to inversely vary the inlet area and the throat area. In practice two of such linkages are used as shown in FIG. 6 but only one will be described in detail as both are identical. The linkage shown looks much like lazy tongs and is mounted to the fixed duct wall 11 on fixed axis 57 which extends through both fixed duct walls so that an identical constrained linkage system 123 may be mounted on the other side of the duct. The linkage is collapsed toward and expanded away from axis 57 by hydraulic actuators 58 and 59 which are mounted to the fixed duct walls or the aircraft.

Figure 7:
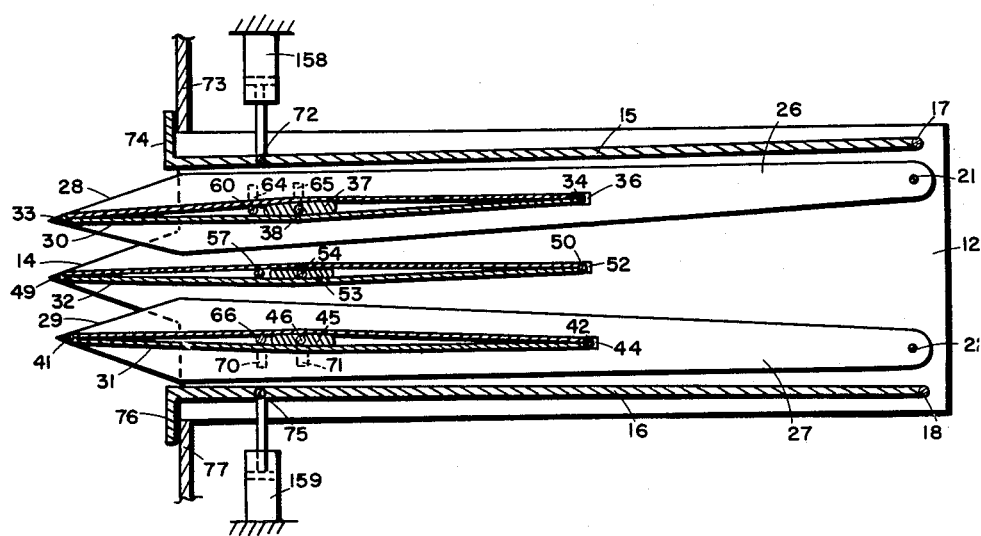
FIG. 7 shows a cross-sectional view of the duct shown in FIG. 4 in a collapsed condition for operation around Mach 1.

A connecting means in the form of sector gear 40 is mounted on axis 60 and attached to arm 61 of the constrained linkage so that it is rotated as the constrained linkage is expanded or collapsed thus rotating the positioning cam 37 as described above. Axis 60 also supports the forward ends of baffle support panels 19 and 26 respectively and is supported by the constrained linkage on either side of the duct. As axis 60 and shaft 38 project through fixed duct wall 11, slots 62 and 63 are provided in the duct wall to allow the axis and the shaft respectively to move relative to said duct wall when the constrained linkage is contracted or expanded. Likewise, as shown in FIG. 5, slot 64 is provided in fixed duct wall 12 for axis 60 which extends through baffle support panel 26 to move said panel up and down. As shown in FIG. 7, slot 65 is also provided in fixed duct wall 12 for shaft 38 to move in similar to slot 62 in duct wall 11. With this arrangement it can be seen that the constrained linkage on either side of the duct can move axis 60 relative to the fixed duct walls 11 and 12 and thus move baffle support panels 19 and 26 with baffle 30 toward and away from center baffle 32.

Baffle 31 is moved toward and away from center baffle 32 in the same manner. Axis 66, like axis 60, is supported by the constrained linkage systems on either side of the duct. Sector gear 48 is mounted on axis 66 and is attached to arm 67 of constrained linkage 23 so that sector gear 48 rotates as the arm 67 is rotated as the linkage is contracted or expanded thereby rotating positioning cam 45. Similar to slots 62 and 63, slots 68 and 69 are provided in fixed duct wall 11 for axis 66 and shaft 46 respectively to move in as the baffle 31 is moved towards and away from baffle 32. As shown in FIG. 5 slot 70 is provided in duct wall 12 to allow axis 66 to move relative to said duct wall. FIG. 7 shows slot 71 which is also provided in duct wall 12 for relative movement of shaft 46 similar to slot 69 in duct wall 11.

Movable duct wall 15 is mounted to the constrained linkage 23 on axis 72 at a point intermediate the forward and rearward ends of said movable duct wall 15. Thereby, as the linkage is contracted the movable duct wall 15 will pivot about axis 17 contracting the inlet area of the duct. Slots 72a and 72b are provided in duct walls 11 and 12 respectively to allow axis 72 to move in as the duct wall 15 is moved to contract the inlet area. At high Mach numbers the movable duct wall 15 is in the open position shown in FIGS. 4, 5 and 6 and is adjacent member 73 which is the leading edge of the wing or part of the main aircraft. Flank 74 is provided at the leading edge of movable duct wall 15 so that as the wall 15 moves away from member 73 at the lower speeds there will not be an opening in the surface of the aircraft.

Similarly, movable duct wall 16 is mounted to constrained linkage 23 on axis 75 so that as the linkage is contracted the movable duct wall 16 will pivot about axis 18 thereby further contracting the inlet area of the duct. Slots 75a and 75b are provided in duct walls 11 and 12 respectively to allow movement of axis 75 as the duct wall 16 is moved to contract the inlet area of the duct. Flange 76 is provided at the leading edge of movable duct wall 16 so that at the lower speeds as the wall is moved away from member 77, which corresponds to member 73, no opening will be left in the leading surface of the aircraft.

As shown in FIG. 6, the constrained linkage 123 on the right side of the intake duct is identical to and provided with the same parts as constrained linkage 23 wherein elements 139, 147 and 155 are positioning gears corresponding to position gears 39, 47 and 55. Sector gears 140, 148 and 156 are mounted on the opposite ends of axes 57, 60 and 66 respectively in the same manner as sector gears 40, 48 and 56 are mounted on the left side of the duct. Hydraulic actuator 158 is connected to the constrained linkage on axis 72 and hydraulic actuator 159 is connected to the constrained linkage on axis 75 corresponding to the manner in which hydraulic actuators 58 and 59 are connected on the left side of the duct in order to contract and expand the constrained linkage 123.

FIG. 7 shows a cross-sectional view of the intake duct in the collapsed condition for operation around an air speed of Mach 1. Here the hydraulic actuators 58, 59, 158 and 159 have compressed the constrained linkages 23 and 123. As shown, movable duct walls 15 and 16 have been pivoted about their axes 17 and 18 respectively to contract the inlet area. The baffle support panels 19, 20, 26 and 27 are moved towards the center baffle 32 since they are supported on said constrained linkages 23 and 123 described above. At the same time the constrained linkages are moving the baffle support panels toward the center baffle, the arms of the linkage systems are rotating to become more horizontal. This rotation, through the sector gears 40, 48, 56, 140, 148 and 156 located on the arms of the constrained linkage systems, has rotated the positioning cams 37, 45 and 53 to a position which is parallel to the longitudinal axis of the duct thereby decreasing the convergency of the forward side of the baffles as the thickness of the baffle was diminished and thereby increasing the throat area of the duct. As the cross-sectional areas of the baffles were diminished the length of them increased and therefore shafts 34, 42 and 50 have been moved to the rearward end of their respective slots in the fixed duct walls and baffle support panels as shown.

Figure 8:
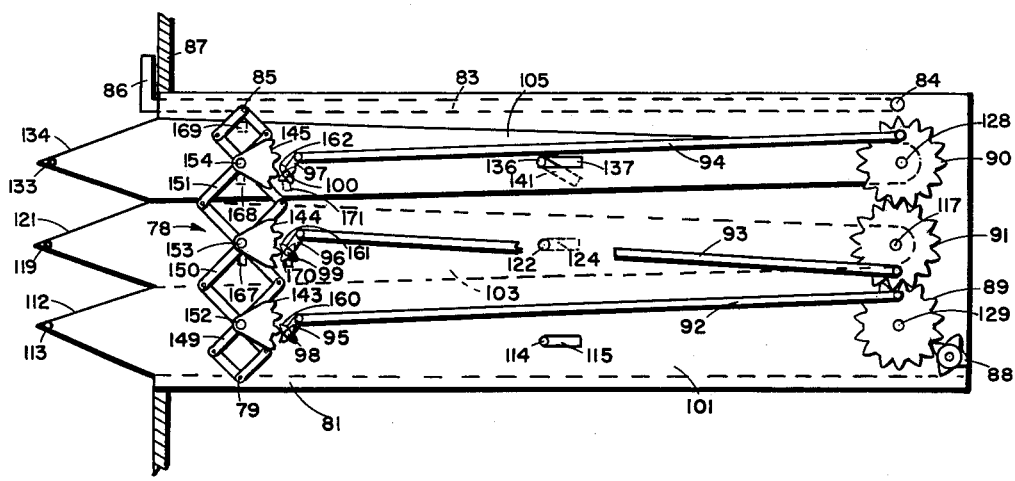
FIG. 8 shows a modification of the duct inlet in which the lower baffle is mounted to the fixed duct walls and only one duct wall is movably mounted.
Figure 9:
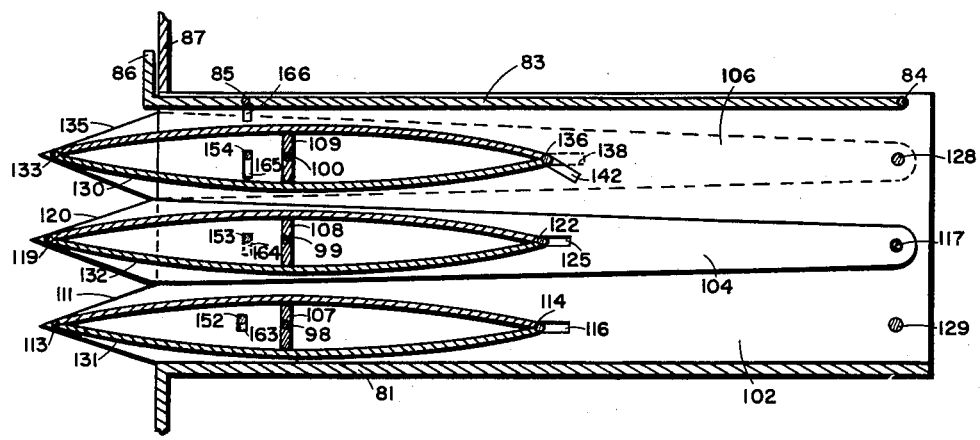
FIG. 9 shows a cross-sectional view of the modified duct shown in FIG. 8.

FIG. 8 shows a side view of another modification of the present invention where the constrained linkage 78 is pivotally connected to joint 79 on the fixed duct wall 101 and duct siding 81 which are fixedly mounted to the aircraft. Another constrained linkage system is provided on the opposite side of the fixed duct wall 82 as in the other modification but since the actuating mechanism is identical on both sides of the duct the mechanism on the opposite side will not be shown or described in detail. It should be understood that said mechanism is provided and does assist in varying the geometry of the duct. Movable duct wall 83 is movably mounted on axis 84 and is mounted to the constrained linkage 78 on shaft 85 so that the linkage contracts it towards the duct siding 81 opposite it. This movable duct wall 83 is provided with flange 86 so that as it is moved away from member 87 which is part of the aircraft there will not be an opening in the leading surface of the aircraft. This modification also differs in that instead of actuating the constrained linkage by hydraulic actuators, control means rotate the positioning gears which positions the constrained linkage. In this modification the control means include actuating gear 88 of the servo motor (not shown) which cooperates with control gear 89 which is engaged with control gears 90 and 91 which are mounted on axes 129, 128 and 117 respectively. Through connecting rods 92, 93 and 94 the rotation of these control gears is transferred to crank members 95, 96 and 97 respectively. These crank members are mounted on shafts 98, 99 and 100 which have positioning gears mounted thereon and extend between fixed duct wall 101 and the fixed duct wall 102 of the opposite side which is shown in FIG. 9. Shafts 99 and 100 are rotatably mounted on the baffle support panels 103 and 104 and the support panels 105 and 106 respectively while shaft 98 is rotatably mounted on fixed duct walls 101 and 102.

Similarly to the other modification shafts 98, 99 and 100 are provided with positioning cams 107, 108 and 109 respectively. These positioning cams are located between the two flexible surfaces of baffles 130, 131 and 132 as shown in FIG. 9.

Similar to baffle 31, baffle 131 is mounted between the fixed duct walls with its forward edge mounted between the projections 111 and 112 on shaft 113 which is welded or attached to the projections. The rearward edge of this baffle is mounted between the fixed duct walls 101 and 102 of shaft 114 which is slideably mounted in slot 115 in fixed duct wall 101 and slot 116 in fixed duct wall 102 in order to allow the cross-sectional area of baffle 131 to be varied.

In order to allow baffle 132 to be moved towards baffle 131 by the action of the constrained linkage systems, this baffle is mounted between baffle support panels 103 and 104 which are movably mounted at their rearward ends on fixed duct walls 101 and 102 respectively on axis 117. The forward ends of the baffle support panels 103 and 104 are moved up and down by the constrained linkage systems through axis 153 which passes through the support panels and the constrained linkage systems on either side of the duct. Baffle 132 is supported at its leading edge by shaft 119 which is mounted between the projections 120 and 121 on baffle support panels 104 and 103 respectively. The rearward end of this baffle is supported by shaft 122 which is sildeably mounted in slots 124 and 125 in baffle support panels 103 and 104 respectively.

Baffle 130 is mounted between baffle support panels 105 and 106 which are movably mounted on axis 128 adjacent the outside surface of fixed duct walls 101 and 102 respectively so that the baffle 130 may be moved towards and away from the duct siding 81 and baffle 131 by action of the constrained linkage systems. The leading edge of baffle 130 is mounted on shaft 133 which is mounted between projections 134 and 135 on baffle support panels 105 and 106 respectively. The rearward edge of baffle 130 is supported on shaft 136 which is slideably mounted in slots 137 and 138 in baffle support panels 105 and 106 respectively. Since these baffle support panels are located outside of the duct walls inclined slots 141 and 142 are provided in fixed duct walls 101 and 102 to allow shaft 136 to move freely because as the baffle is moved downwardly the thickness of the baffle is diminished thereby causing shaft 136 to move rearwardly.

The linkage system, as in the other modification, has one sector gear provided for each baffle which is mounted to each constrained linkage system. Thus sector gears 143, 144 and 145 are mounted on arms 149, 150 and 151 of constrained linkage 78 on axes 152, 153 and 154 in the same manner as described in more detail with regard to the other modification. Likewise, positioning gears 160, 161 and 162 are provided on axes 98, 99 and 100 which engage their respective sector gears 149, 150 and 151. Thereby, rotation of actuating gear 88 causes control gears 89, 90 and 91 to rotate, which rotation is transferred to crank elements 95, 96 and 97 causing positioning gears 160, 161 and 162 to rotate sector gears 149, 150 and 151. This action will collapse or expand the constrained linkage thus moving the baffles 130, 131 and 132 and the movable duct wall 83 towards or away from fixed duct siding 81 since the constrained linkage system is pivotally connected to fixed duct wall 101 at joint 79 while simultaneously the positioning cams 107, 108 and 109 are rotated to decrease or increase the cross-sectional area of the baffles.

As provided in the other modification, a constrained linkage system is provided on the outward side of fixed duct wall 102 along with sector gears, positioning gears, crank elements, connecting rods, control gears and an actuating gear as is provided for constrained linkage system 78 on the near side. These elements were not shown or described since they are identical in structure and operation to the elements described immediately above.

As the shafts 152, 153, 154 and 85 extend through the fixed duct walls 101 and 102 and move relative to them slots 163, 164, 165 and 166 shown in FIG. 9 and slots 167, 168 and 169 shown in FIG. 8 have been provided to allow this movement similar to the other modification. A slot not shown is also provided in fixed duct wall 101 to allow axis 152 to move relative to the duct wall.

Slot 170 is provided in fixed duct wall 101 and a similar slot is provided in fixed duct wall 102 to allow axis 99 to move relative to the fixed duct walls as the baffle support panels 103 and 104 are moved up and down. As shown by the hidden lines in FIG. 8, slot 171 is provided in fixed duct wall 101 to allow axis 100 to move up and down with the baffle support panels 105 and 106. A similar slot is provided in fixed duct wall 102 behind the positioning cam 109 in FIG. 9.

In both of the modifications the ratio between the rate of change of the inlet area and the rate of change of the throat area may be varied by changing the length of the arms of the constrained linkage systems since, if the arms are longer, the movable duct walls will move towards or away from each other farther with the same rotation of the arms and correspondingly the rotation of the positioning cams. The ratio can also be changed by varying the gear ratio between the positioning gears and the sector gears. For instance, if larger diameter positioning gears are provided with the same diameter sector gears, the sector gear would be rotated further by the rotation of the positioning blade from vertical to horizontal or vice versa and this further rotation would cause the movable duct walls and the baffles to move further away from or towards each other.

It can also be seen that the actuating mechanism shown in the second modification can be used with the first modification. Likewise, hydraulic actuators can be used on the second modification. This is because the means located within the baffles and the constrained linkage cooperate together through the connecting means. Therefore, moving the constrained linkage to vary the inlet area of the duct will rotate the positioning gears and cams to vary the throat area and conversely rotating the positioning gears to vary the throat area of the duct moves the constrained linkage systems to vary the inlet area of the duct.

It should be appreciated that the invention is applicable to any apparatus for providing an optimum amount of gas to a jet engine with a maximum pressure recovery and that, although only a few forms of the invention have been shown and described, it will be apparent to those skilled in the art that the invention is not so limited but that various modifications may be made therein without deviating from the spirit of the invention or the scope of the appended claims.

I claim:

1. In a jet engine intake duct, wall means forming a fixed duct aperture at the front of the duct, a movable duct wall portion within said wall means to vary an area of the duct aperture, means to vary the position of said movable wall portion relative to said wall means, expandable baffle means mounted transversely within the duct forming with said wall means, a throat section spaced rearwardly of said duct aperture and means to expand said baffle means to vary the throat section of the duct; flange means formed on said duct wall portion adjacent said wall means providing that no opening shall occur therebetween during relative movements thereof.

2. A jet engine intake duct including two oppositely mounted fixed duct wall portions, two movable duct walls forming with said fixed duct wall portions a duct with a predetermined inlet area, said movable duct walls being so mounted that movement will vary the inlet area of the duct, each of said fixed duct wall portions having at least two movable baffle support panels swingably mounted at its rearward end thereon, at least two variable baffles located within the duct mounted transversely between said baffle support panels forming with said walls a throat section of the duct, positioning means located within said baffles to cause them to expand and to diminish the area of the throat of the duct, and control means cooperating with said means within the baffles and the movable duct walls to simultaneously vary the inlet area of the duct and the throat area of the duct in mutually inverse relation.

3. The invention as claimed in claim 2 wherein the positioning means is located at the mid section of the baffles and includes a positioning cam mounted on an axis which is rotatably mounted between the baffle support panels.

4. In an engine intake duct, wall means forming a duct having an inlet area including two oppositely mounted fixed duct wall portions and at least one movable duct wall portion mounted substantially transversely to said fixed duct wall portions, expandable baffle means located within the duct and mounted between said fixed duct wall portions, said baffle means forming with said wall means a throat section in the duct, said expandable baffle means having two flexible surfaces, positioning means located within said expandable baffle means between said flexible surfaces for expanding the mid-section of the baffle to diminish the throat area of the duct, at least one system of constrained linkage pivotally connected to one of said fixed duct walls and to said movable duct wall respectively, control means for actuating said positioning means to effect expansion and contraction of said baffle means, and connecting means responding to actuation of said positioning means for actuating said constrained linkage system to effect movement of said movable duct wall portion relative to said fixed duct wall portions whereby the areas of said inlet and throat respectively may be simultaneously varied in mutually inverse relation.

5. In a jet engine intake duct wall means forming a duct having a predetermined inlet area and including two oppositely mounted fixed duct wall portions and two oppositely mounted movably duct wall portions mounted substantially transversely to said fixed duct walls to vary the inlet area of the duct, each of said fixed duct walls having at least one movable baffle support panel swingably mounted thereon at the rearward end of said support panel, each of said support panels forming a projection at its respective forward end, a variable baffle having a forward and rearward end mounted transversely between said support panels and forming with said wall means a throat section rearward of said inlet area, said variable baffle having two flexible surfaces and being rigidly mounted at its forward end to said projections of said support panels while being slideably mounted to said support panels at its rearward end, a positioning cam located between said two flexible surfaces on each baffle to vary the cross-sectional area of the baffle and thereby vary the area of the throat section, said positioning cam being rotatably mounted in said oppositely mounted support panels and provided with a positioning gear at either end of said positioning blade, at least one system of constrained linkage with one point in the system pivotally connected to one of said fixed duct wall portions; said movable duct wall portions and said baffle support panels being pivotally connected to said constrained linkage system, said connecting means on said system cooperating with said positioning gears in rotating relation, and actuating means for compressing or extending said system of constrained linkage whereby said movable duct wall portions, said baffle support panels, and said positioning cam may be moved causing the areas of the inlet and throat respectively to be varied in mutually inverse relation.

6. A jet engine intake duct having a longitudinal axis, including: wall means forming a duct inlet of predetermined cross-sectional area at the front of the duct, said wall means including at least one movable portion movable to vary the inlet area; duct throat cross-sectional area restriction means mounted within the duct forming with said wall means a duct throat section spaced rearwardly of said inlet area; means within said throat area restriction means being movable to expand and contract said throat area restriction means to vary the cross-sectional area of the throat section of said duct; and actuation means exterior of said wall means substantially positioned in a plane vertical to said longitudinal axis for actuating said means within said throat area restriction means to vary the restriction of said throat area and for moving said movable portion to vary said inlet area; said actuation means being capable of actuating said movable portion and throat area restriction means simultaneously so that said inlet area is proportionally increased and said throat area is proportionally decreased during increasing supersonic movements of said jet engine intake duct relative to an aerodynamic environment whereby optimum amounts of said aerodynamic environment are received by said jet engine intake duct during increasing supersonic movements thereof.

References Cited in the file of this patent

UNITED STATES PATENTS

| | | |
|---|---|---|
| 2,551,470 | Smith | May 1, 1951 |
| 2,625,008 | Crook | Jan. 13, 1953 |
| 2,763,426 | Erwin | Sept. 18, 1956 |
| 2,772,620 | Ferri | Dec. 4, 1956 |
| 2,788,635 | Ford | Apr. 16, 1957 |
| 2,840,322 | Griffith | June 24, 1958 |

FOREIGN PATENTS

| | | |
|---|---|---|
| 166,124 | Australia | Nov. 25, 1955 |
| 593,022 | Great Britain | Oct. 7, 1947 |
| 455,566 | Italy | Mar. 2, 1950 |